(12) United States Patent
McKinney, Jr.

(10) Patent No.: US 10,850,701 B1
(45) Date of Patent: Dec. 1, 2020

(54) SAFETY RESTRAINT NON-COMPLIANCE LIGHT

(71) Applicant: Robert E. McKinney, Jr., Blue Springs, MO (US)

(72) Inventor: Robert E. McKinney, Jr., Blue Springs, MO (US)

( * ) Notice: Subject to any disclaimer, the term of this patent is extended or adjusted under 35 U.S.C. 154(b) by 0 days.

(21) Appl. No.: 15/490,428

(22) Filed: Apr. 18, 2017

(51) Int. Cl.
| | |
|---|---|
| *B60R 22/48* | (2006.01) |
| *B60Q 1/50* | (2006.01) |
| *B60Q 1/44* | (2006.01) |

(52) U.S. Cl.
CPC ............ *B60R 22/48* (2013.01); *B60Q 1/50* (2013.01); *B60Q 1/44* (2013.01); *B60R 2022/4816* (2013.01); *B60R 2022/4825* (2013.01); *B60R 2022/4858* (2013.01); *B60R 2022/4875* (2013.01)

(58) Field of Classification Search
None
See application file for complete search history.

(56) References Cited

U.S. PATENT DOCUMENTS

| | | | | |
|---|---|---|---|---|
| 5,073,842 | A * | 12/1991 | Monroe | B60Q 1/56 362/497 |
| 5,714,930 | A * | 2/1998 | McKinney, Jr. | B60R 22/48 340/457.1 |
| 7,812,716 | B1 * | 10/2010 | Cotter | B60Q 1/50 340/457.1 |
| 10,112,528 | B1 * | 10/2018 | Mazuir | B60Q 1/268 |
| 2013/0141578 | A1 * | 6/2013 | Chundrlik, Jr. | B60R 1/12 348/148 |
| 2017/0190283 | A1 * | 7/2017 | Ding | B60T 7/042 |

\* cited by examiner

*Primary Examiner* — John F Mortell

(57) ABSTRACT

A source of illumination is positioned on a vehicle facing rearwardly. Multi-function controls include a first control and a second control. The first control illuminates the source of illumination and provides a first signal when a driver depresses a brake pedal. The second control illuminates the source of illumination and provides a second signal when an occupant of the vehicle is not using a seat belt. The second signal is an indicator signal adapted to be read by an automatic license plate reader. The indicator signal is chosen from the class consisting of an alpha-numeric signal and a sequencing pattern signal. The alpha-numeric signal is created by light shining through a translucent panel with opaque alpha-numeric markings. The sequencing signal is created by a light turning on and off.

1 Claim, 4 Drawing Sheets

SAFETY RESTRAINT NON-COMPLIANCE LIGHT

BACKGROUND OF THE INVENTION

Related Application

The present application is an improvement over my prior application Ser. No. 08/654,826 filed May 29, 1996, now U.S. Pat. No. 5,714,930 issued Feb. 3, 1998.

Field of the Invention

The present invention relates to a safety restraint non-compliance light and more particularly pertains to providing a brake light and a seat belt light, the seat belt light being readable by an automated license plate reader.

DESCRIPTION OF THE PRIOR ART

The use of indicator lights is known in the prior art. More specifically, indicator lights previously devised and utilized for the purpose of indicating a situation of concern are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a safety restraint non-compliance light that provides a brake light and a seat belt light, the seat belt light being readable by an automated license plate reader.

In this respect, the safety restraint non-compliance light according to the present invention substantially departs from the conventional concepts and designs of the prior art, and in doing so provides an apparatus primarily developed for the purpose of providing a brake light and a seat belt light, the seat belt light being readable by an automated license plate reader.

Therefore, it can be appreciated that there exists a continuing need for a new and improved safety restraint non-compliance light which can be used for providing a brake light and a seat belt light readable by an automated license plate reader. In this regard, the present invention substantially fulfills this need.

SUMMARY OF THE INVENTION

In view of the disadvantages inherent in the known types of indicator now present in the prior art, the present invention provides an improved safety restraint non-compliance light. As such, the general purpose of the present invention, which will be described subsequently in greater detail, is to provide a new and improved safety restraint non-compliance light and method which has all the advantages of the prior art and none of the disadvantages.

To attain this, the present invention essentially comprises a source of illumination positioned on a vehicle facing rearwardly. Multi-function controls include a first control to illuminate the source of illumination and provide a first signal when a driver depresses a brake pedal. The multi-function control includes a second control to illuminate the source of illumination and provide a second signal when an occupant of the vehicle is not using a seat belt. The second signal is an indicator signal adapted to be read by an automatic license plate reader.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved safety restraint non-compliance light which has all of the advantages of the prior art indicator and none of the disadvantages.

It is another object of the present invention to provide a new and improved safety restraint non-compliance light which may be easily and efficiently manufactured and marketed.

It is a further object of the present invention to provide a new and improved safety restraint non-compliance light which is of durable and reliable constructions.

An even further object of the present invention is to provide a new and improved safety restraint non-compliance light which is susceptible of a low cost of manufacture with regard to both materials and labor, and which accordingly is then susceptible of low prices of sale to the consuming public, thereby making such safety restraint non-compliance light economically available to the buying public.

Lastly, it is an object of the present invention to provide a safety restraint non-compliance light for providing a brake light and a seat belt light, the seat belt light being readable by an automated license plate reader.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
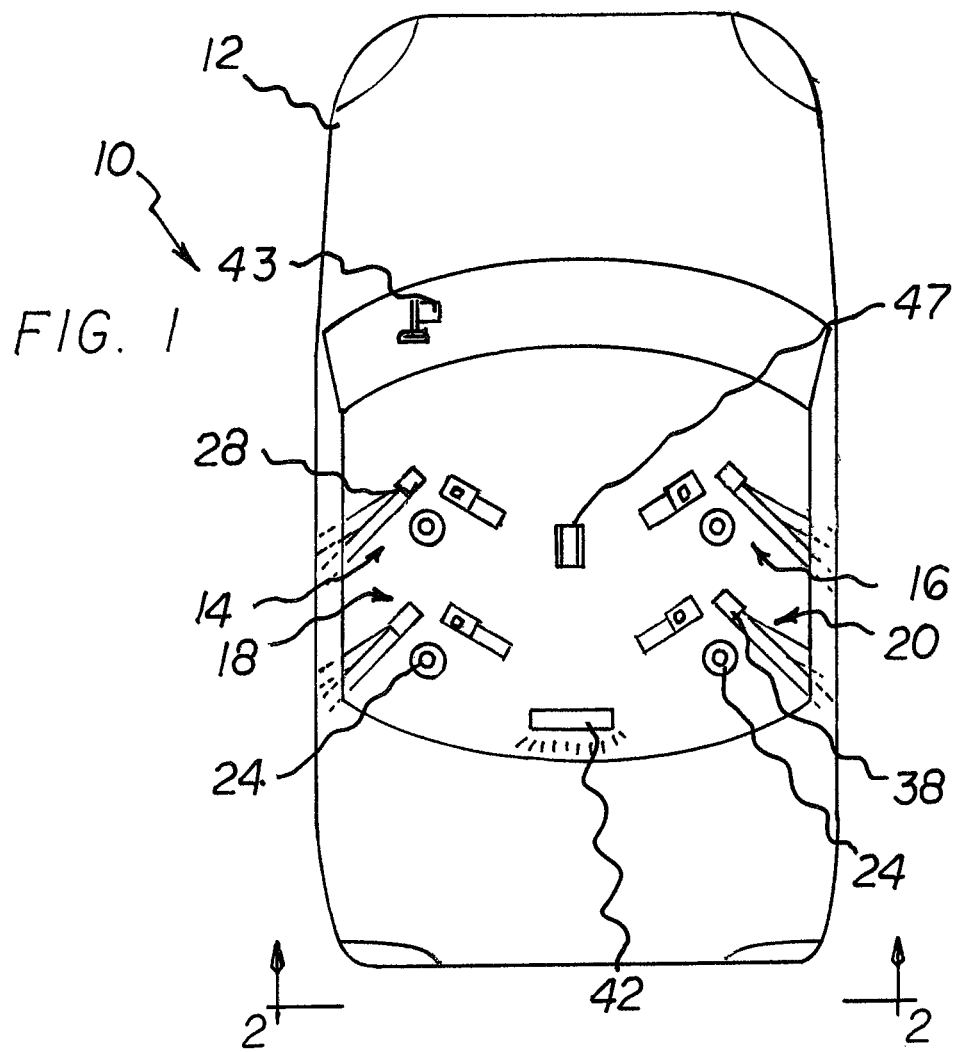
FIG. 1 is a top plan view of a vehicle equipped with the preferred embodiment of the safety restraint non-compliance light constructed in accordance with the principles of the present invention.
Figure 2:
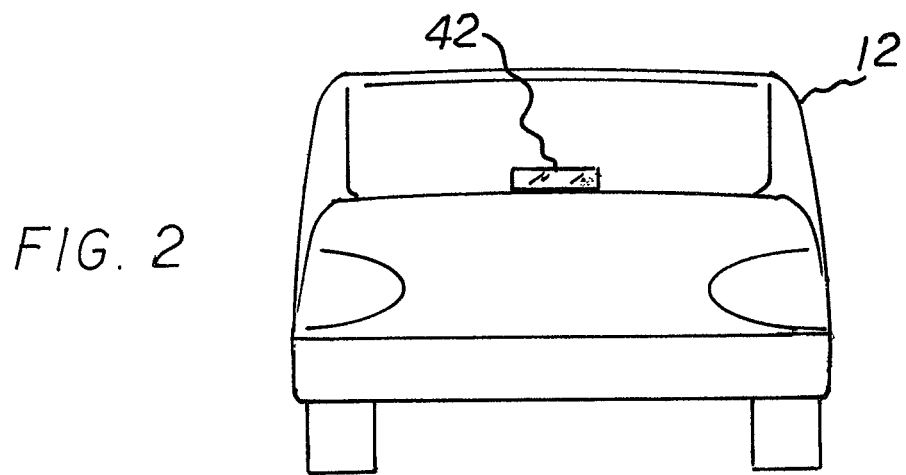
FIG. 2 is a rear elevational view of the vehicle and safety restraint non-compliance light shown in FIG. 1.
Figure 3:
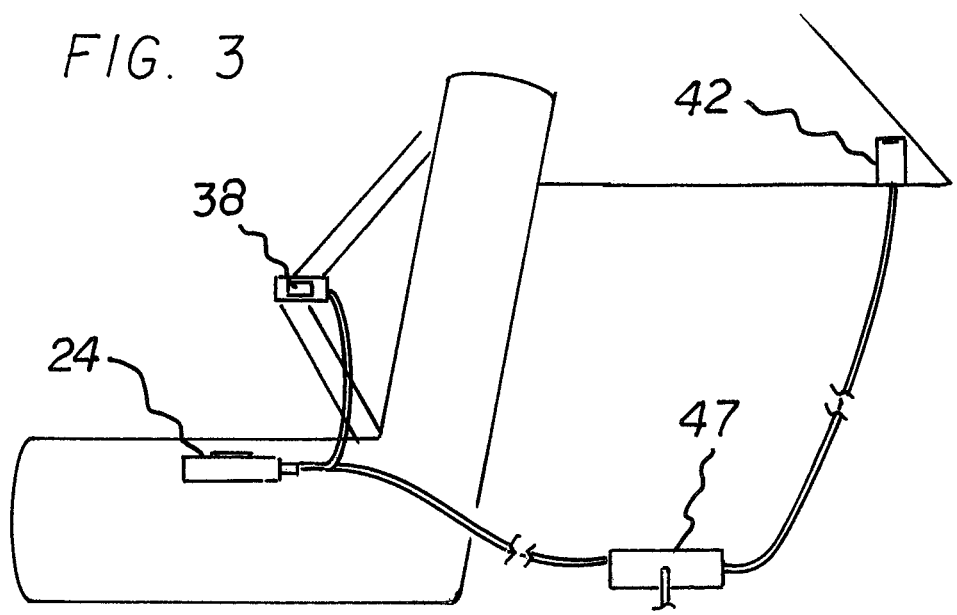
FIG. 3 is a side elevational view of one of the seats and its associated indicator components shown in FIGS. 1 and 2.
Figure 4:
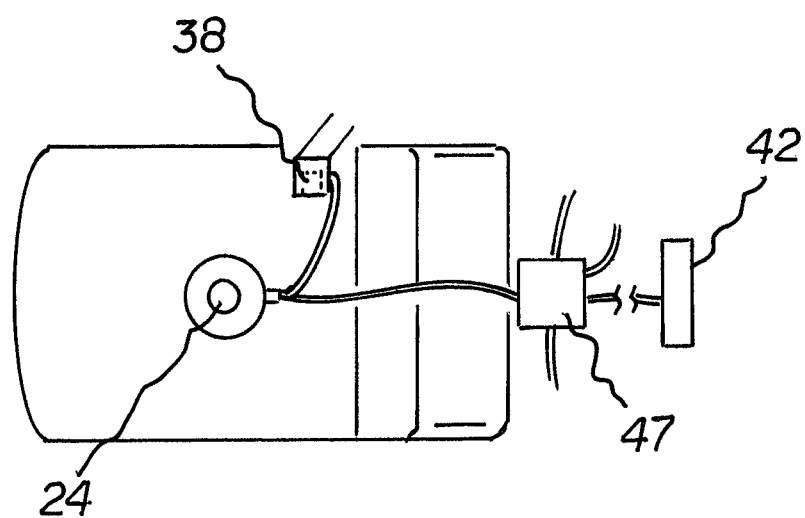
FIG. 4 is a top plan view of the components shown in FIG. 3.

With reference now to the drawings, and in particular to FIG. 1 thereof, a new and improved safety restraint non-compliance light to indicate when automotive passengers are not utilizing their seat belts embodying the principles and concepts of the present invention and generally designated by the reference numeral 10 will be described.

The present invention, the new and improved safety restraint non-compliance light, is comprised of a plurality of components. Such components in their broadest context include a source of illumination positioned on a vehicle facing rearwardly. Multi-function controls include a first control to illuminate the source of illumination and provide a first signal when a driver depresses a brake pedal. The multi-function controls include a second control to illuminate the source of illumination and provide a second signal when an occupant of the vehicle is not using a seat belt. The second signal is an indicator signal adapted to be read by an automatic license plate reader. The indicator signal is chosen from the class consisting of an alpha-numeric signal and a sequencing pattern signal. The alpha-numeric signal is created by light shining through a translucent panel with opaque alpha-numeric markings. The sequencing signal is created by a light turning on and off. Such components are individually configured and correlated with respect to each other so as to attain the desired objective.

More specifically, it will be noted that the present invention is a system 10. A major component of the system 10 is a vehicle 12. The vehicle has a front left seat 14, a front right seat 16, a rear left seat 18 and a rear right seat 20. The system 10 can be incorporated into any type of vehicle. Some vehicles include three different sets of seat belts incorporated into a rear passenger area of the vehicle. The system 10 can be adapted to accommodate the number of seat belts within the vehicle.

Another major component of the system 10 of the present invention is a pressure indicator switch 24. The pressure indicator switch is located beneath each seat. Each seat generates a pressure responsive signal to indicate the presence of a passenger sitting thereon. A pressure sensitive switch 24 will be located beneath each seat where a seat belt is incorporated. Each pressure indicator switch 24 would be installed within the padding of the seat at a position adjacent to the upper surface of the seat.

Next provided as a major component of the system 10 of the present invention is the seat belt 28. The seat belt 28 has a female receptacle 30. Such receptacle 30 is secured within the vehicle 12 on one side of the passenger. A strap 32 with a male projection 34 is positionable in the female receptacle 30 on the other side of the seats and passenger. The seat belt 28 is the standard seat belt used in vehicles.

Next provided is a switch 38. Such switch 38 is interior of the female receptacle 30 to indicate the coupling of the male projection 34 to the female receptacle 30 and thus the coupling and use of the seat belt 28. The switch 38 serves to correspond with the pressure indicator switch 24 within the seats whereby the pressure indicator switch 24 is activated upon a driver or passenger seated within the vehicle. In order to deactivate the pressure indicator switch 24, the driver or passenger must insert the male projection 34 into the female receptacle 30 in order to trigger the switch 38.

A light 42 is provided. The light 42 is located in the rear of the vehicle. The light 42 is preferably located in a position within the vehicle where it can be easily viewed from outside of the vehicle, especially by law enforcement officers. The light 42 is adapted to be illuminated in response to at least one of the seats when occupied but the associated seat belt 28 is not utilized. The light 42 is off when the seats are not occupied and have an associated unbuckled seat belt. The light 42 will illuminate upon a driver or passenger seated in one of the seats. This will cause the pressure indicator switch 24 to activate the light 42. The light 42 will de-illuminate once the driver or passenger inserts the male projection 34 into the female receptacle 30 in order to trigger the switch 38.

The light includes a second source of illumination adapted to illuminate in a sequencing pattern, the light and the second source of illumination are chosen from the class consisting of an incandescent bulb and a light emitting diode. The second source of illumination is adapted to be read by an automatic license plate reader. Multi-function controls are provided and include a first control to illuminate the light and a second control to illuminate the second source of illumination.

Figure 7:
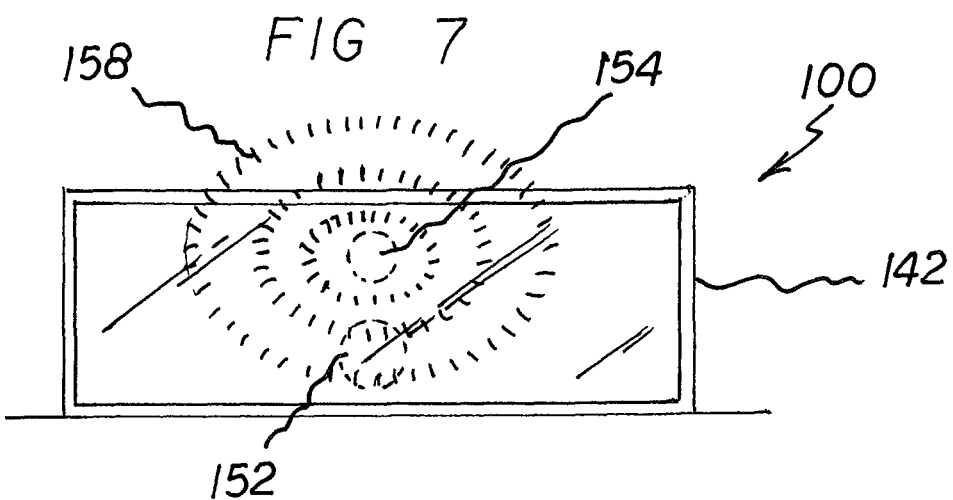
FIG. 7 is a rear elevational view of a brake light/seat belt light constructed in accordance with the primary embodiment of the invention.

As may be seen in FIG. 7, the primary embodiment 100 of the invention includes a light 142 with a first source of illumination 152 and a second source of illumination 154, the second source of illumination 154 is =adapted to generate a sequencing signal 158 created by turning on and off the second source of illumination.

Figure 8:
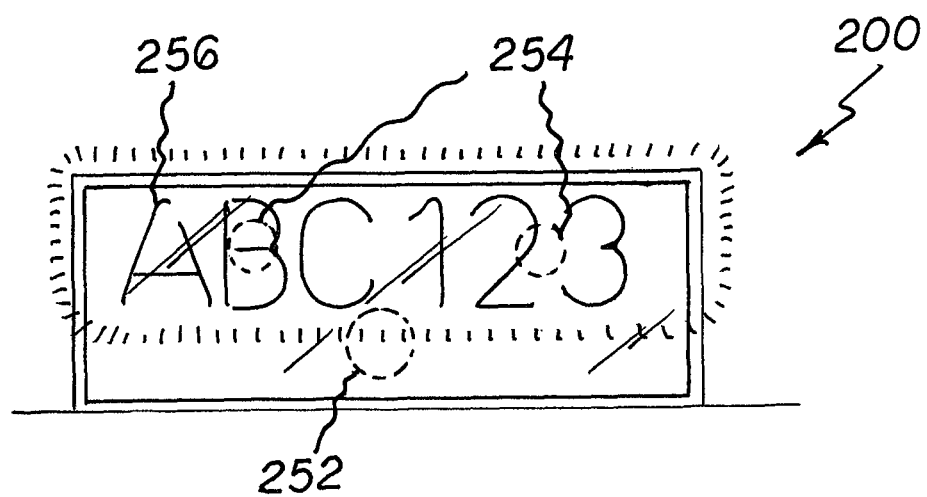
FIG. 8 is a rear elevational view of a brake light/seat belt light constructed in accordance with an alternate embodiment of the invention.

As may be seen in FIG. 8, the alternate embodiment 200 of the invention includes a light 242 with a first source of illumination 252 and a second source of illumination 254, the second source of illumination 254 is created by light shining through a translucent panel 256 with opaque markings 254.

Figure 5:
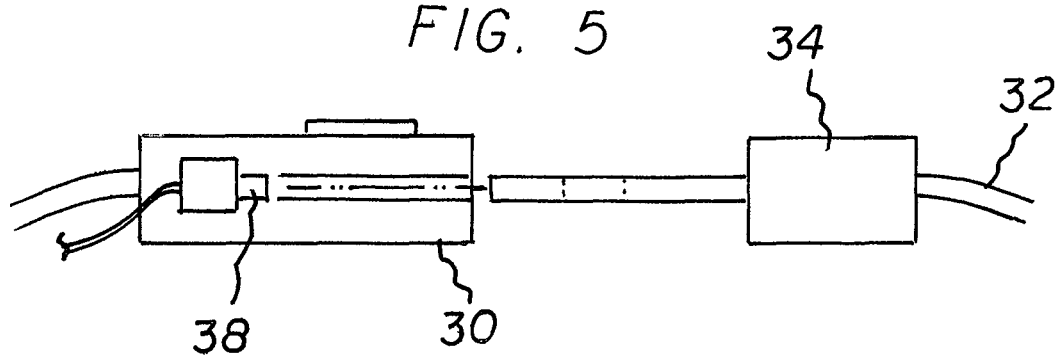
FIG. 5 is an enlarged side elevational view of the buckling pawn utilized in the seat belt of the prior FIGs.

As best shown in FIG. 5, a brake switch 43 is coupled to a brake pedal of the vehicle 44 for providing indication that the vehicle is moving. Since it is conventional in the art of vehicles to require the depression of the brake pedal in order to place the vehicle in gear, the present invention utilizes the brake switch to monitor the movement of the vehicle. The brake switch is orientated so as to maintain a first orientation for allowing the generation of a signal upon the actuation of the vehicle. The switch further has a second orientation which is maintained upon the depression of the brake pedal. The second orientation is included for precluding the generation of the associated signal. To allow the switch to perform its operation properly, the brake switch is preferably connected to an alternator 45 of the vehicle in order to allow the switch to return to the first orientation thereof upon the deactivation of the vehicle. It should be noted that the brake switch is constructed of commonly known and conventional components.

Figure 6:
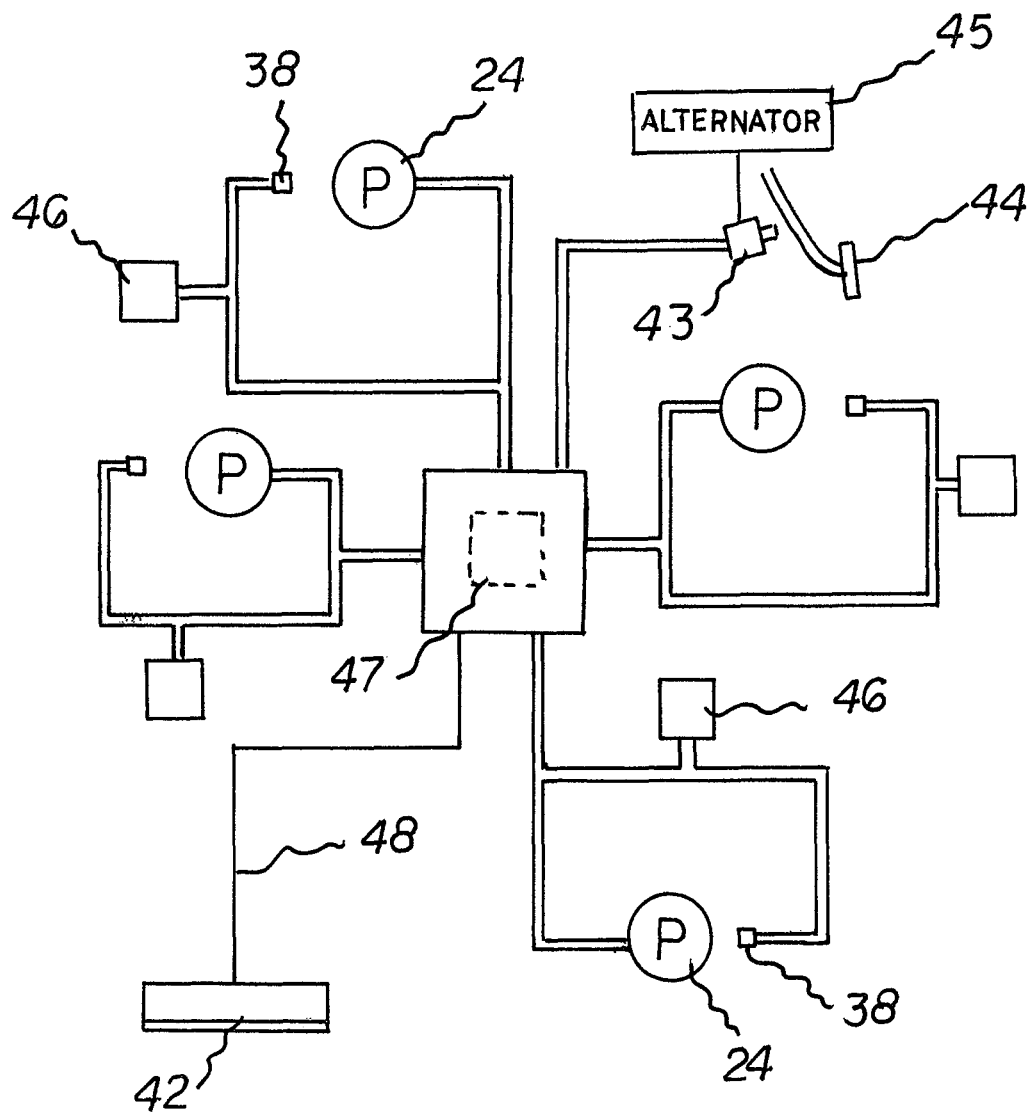
FIG. 6 is an electrical schematic of the system shown in the prior FIGs.

As shown in FIG. 6, a seat belt retractor switch 46 is coupled to a conventional seat belt retractor. The present switch is adapted to maintain an open orientation only when the seat belt is extended past a certain length. Such may be done by coupling a first brush-type contact in a fixed location adjacent to the seat belt retractor and further coupling a second flexible strip contact to the seat belt for providing communication with the first contact in a predetermined range of seat belt extension. Other methods may also be employed to effect a similar result.

Lastly provided is a junction box 47. Such junction box 47 has an outlet line 48. This is to illuminate the light 42 when it receives a signal from at least one of the switches 38. The junction box 47 also has a plurality of input lines. Each line is coupled from each pressure switch 24 and is adapted to illuminate the light 42 when the person is sitting on the seat. There is also provided a first associated auxiliary line. Such auxiliary line extends from each seat belt 28 to the junction box 47 to terminate power from its associated pressure switch 24 to the junction box 47. This is to preclude illumination of the light 42 when a person is sitting on the pressure switch 24 and the seat belt 28 is buckled. The first auxiliary line is further employed to provide communication between the seat belt retractor switch. The seat belt retractor switch is adapted to terminate power from its associated pressure switch to the junction box when a person has coupled the male projection and female receptacle without actually wearing the seat belt. For providing communication with the brake switch an associated second auxiliary line is coupled between the brake switch and the junction box. Such connection is included to preclude illumination of the light prior to the brake pedal being pressed after actuation of the vehicle. As such, the light is prevented from being actuated when the vehicle has been started and is parked.

The present invention is a seat belt indicator light. Pressure activated switches 24 are placed in each passenger seat and driver seat of a vehicle 12. The pressure switches 24 activate when passengers sit in the seat of the vehicle 12. A disconnect switch 38 is installed in each seat belt female buckle 30 to deactivate the pressure switches 24 when the belt is in use. An indicator light 42 is installed in the rear window brake light when seat belts 28 are not utilized. The indicator light 42 will help enforce state seat belt laws and produce revenue from violators for city and state governments. The most important feature of this light, however, is the increased use of seat belts and to save lives.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A safety restraint non-compliance light system to indicate when automotive passengers are not utilizing their seat belts, the system comprising:

a vehicle with a front left seat and a front right seat and a rear left seat and a rear right seat;

a pressure indicator switch located beneath each seat, each seat to generate a pressure responsive signal to indicate the presence of a passenger sitting thereon, each pressure indicator switch being installed within padding of the seat at a position adjacent to an upper surface thereof;

a seat belt with a female receptacle secured to one side of the passenger and a strap with a male projection positionable in the female receptacle on the other side of the seats and passengers;

a switch interior of the female receptacle to indicate the coupling of the male projection to the female receptacle and thus the coupling and use of the seat belt;

a brake switch coupled to a brake pedal of the vehicle for providing an indication whether the vehicle is moving, the brake switch adapted to maintain a first orientation for generating a signal upon the actuation of the vehicle, wherein the switch has a second orientation upon the depression of the brake pedal for precluding generation of the associated signal;

a seat belt retractor switch coupled to a conventional seat belt retractor and adapted to maintain an open orientation only when the seat belt is extended past a certain length which is the distance between the female receptacle and the male projection, the seat belt retractor switch having a first brush-type contact in a fixed location adjacent to the seat belt retractor and a second flexible strip contact situated on the seat belt for providing communication with the first contact when the seat belt is extended past the certain length;

a first source of illumination and a second source of illumination in a rear brake light assembly situated in a rear window of the vehicle, the first source of illumination and the second source of illumination being adapted to be illuminated in response to at least one of the seats being occupied but the associated seat belt not being utilized and to be unilluminated when no occupied seat has an associated unbuckled seat belt, the second source of illumination being adapted to illuminate in a sequencing pattern, the first source of illumination and the second source of illumination being chosen from the class consisting of an incandescent bulb and a light emitting diode, an automatic license plate reader, the second source of illumination adapted to be read by the automatic license plate reader;

multi-function controls including a first control to illuminate the light and a second control to illuminate the second source of illumination; and a junction box with an outlet line to illuminate the lamp when receiving a signal from at least one of the switches and a plurality of input lines one coupled from each pressure switch adapted to illuminate the light when the person is sitting on the seat, an associated first auxiliary line coupled between each seat belt to the junction box through its associated pressure switch to terminate power from its associated pressure switch to the junction box to preclude illumination of the light when a person is sitting on the pressure switch and the seat belt is buckled wherein the first auxiliary line is further employed to provide communication between the seat belt retractor switch so as to also terminate power from its associated pressure switch to the junction box when a person has coupled the male projection and female receptacle without actually wearing the seat belt, and an associated second auxiliary line coupled between the brake switch and the junction box to preclude illumination of the light prior to the brake pedal being pressed after actuation of the vehicle thereby preventing the light from being actuation when the vehicle is parked.

* * * * *